Figure 1:
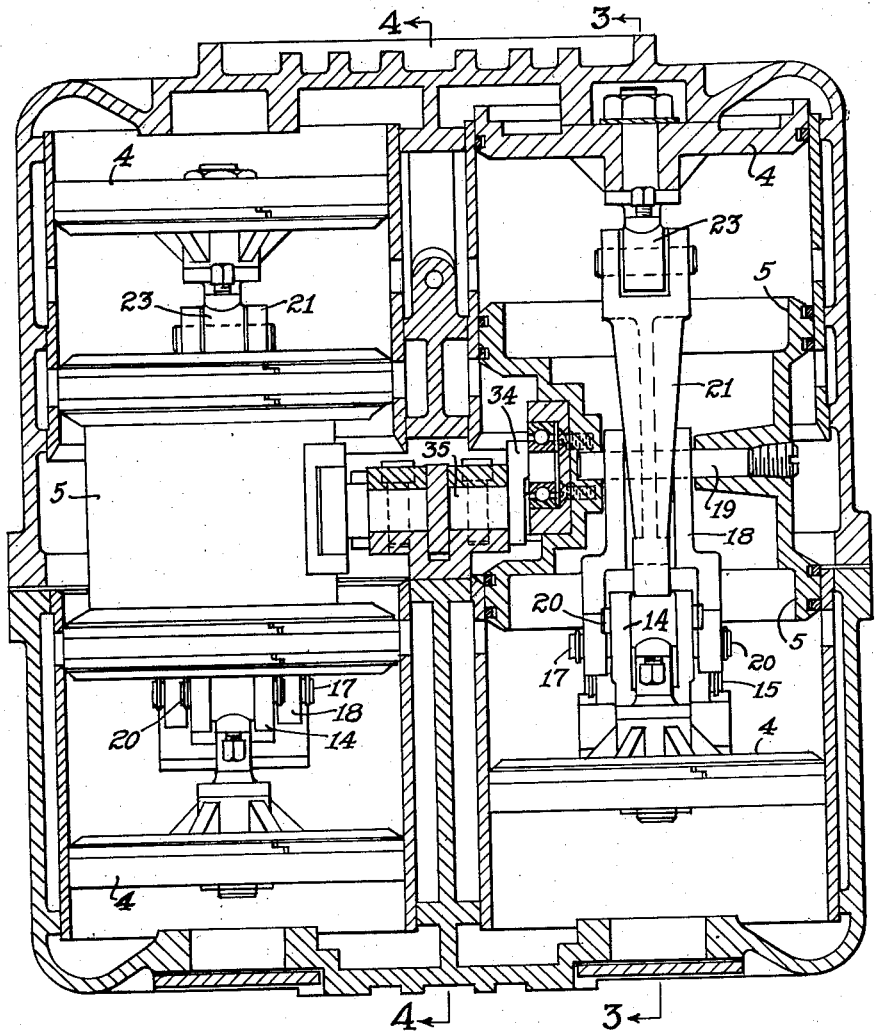

June 27, 1939.  L. McCANDLESS  2,163,794
PISTON METER
Filed Sept. 9, 1937    2 Sheets-Sheet 2

INVENTOR
Lyon McCandless
by William D Jaspert
Attorney.

Patented June 27, 1939

2,163,794

UNITED STATES PATENT OFFICE 2,163,794

PISTON METER

Lyon McCandless, Beaver Falls, Pa., assignor of forty-five per cent to Clifford H. Beegle and ten per cent to John A. Elliott, Beaver County, Pa.

Application September 9, 1937, Serial No. 163,106

5 Claims. (Cl. 73—245)

This invention relates to new and useful improvements in liquid measuring meters, more particularly of the piston displacement type and it is among the objects thereof to provide a piston meter in which piston valves controlling the flow to and from the cylinder chambers, which are the liquid measuring chambers, are in coaxial alignment with the measuring pistons and are directly actuated by the measuring pistons and travel but a fraction of the distance of the measuring pistons.

A further object of the invention is the provision of a meter of the above designated character in which the piston valve travel is less than the measuring piston travel and the valve piston is disposed to be operative between the measuring pistons.

Still a further object of the invention is the provision of a connecting linkage between the measuring pistons and piston valves, to maintain a proportionate travel thereof, the piston valves being adapted to actuate the crank shaft and connected register mechanism of the meter.

Figure 2:
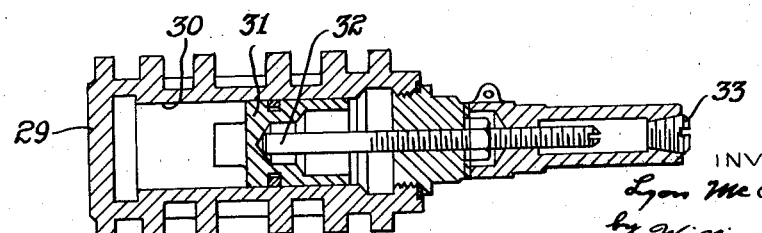
Figure 3:
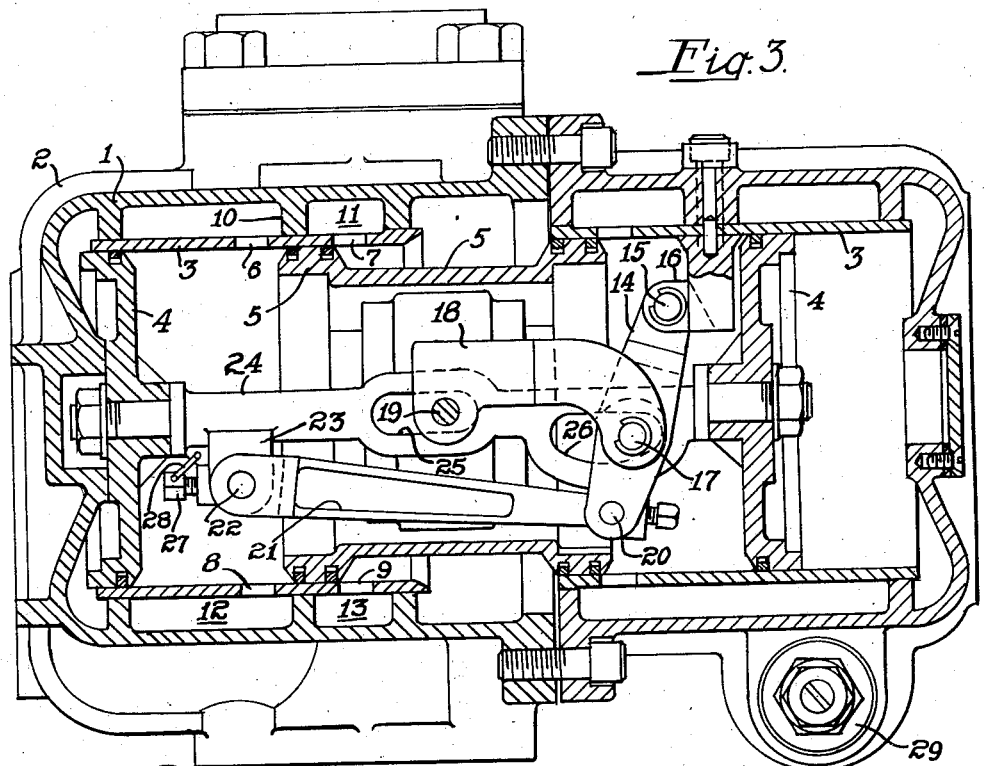
Figure 4:
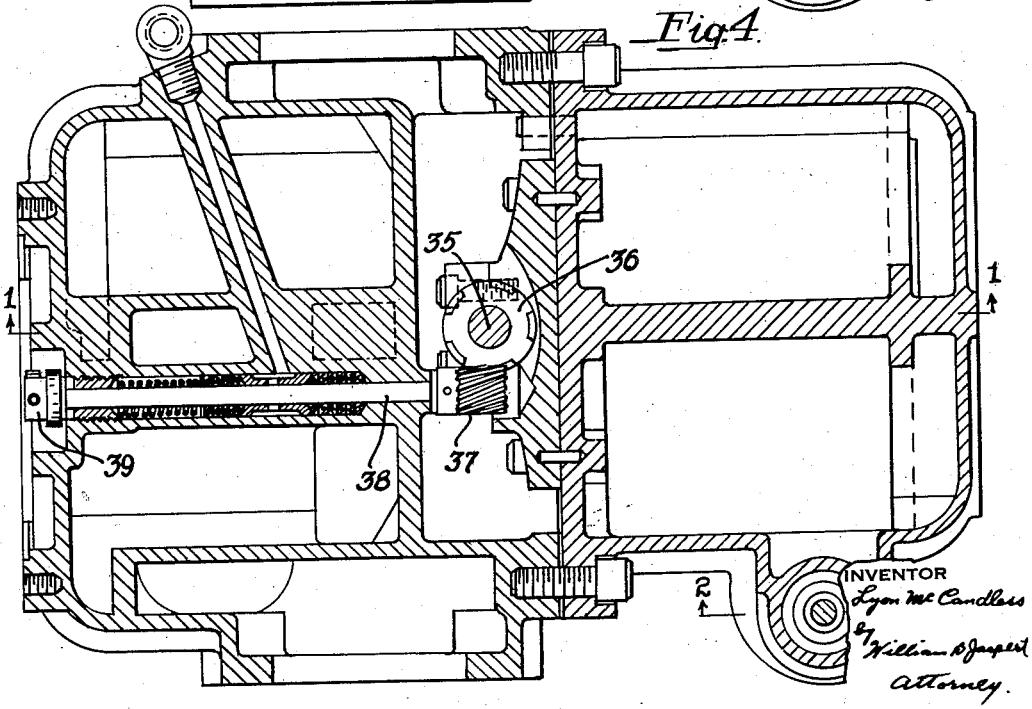

These and further objects of the invention will become more apparent from a consideration of the accompanying drawings constituting a part hereof in which like reference characters designate like parts and in which:

Fig. 1 is a cross-sectional view of a piston type meter taken on the line 1—1, Fig. 4;

Fig. 2 a cross-sectional view taken on the line 2—2, Fig. 4;

Fig. 3 a cross-sectional view partially in elevation of the meter taken along the line 3—3, Fig. 1;

Fig. 4 a cross-sectional view of the meter taken along the line 4—4, Fig. 1.

With reference to Fig. 3 of the drawings, the structure therein illustrated comprises a meter casing 1 that is ribbed as indicated at 2 to give it a structural cross-section for strength, and provided with cylinder linings 3 in which are operatively disposed piston elements 4 and 5, pistons 4 being the fluid displacement or measuring pistons and hollow pistons 5 the fluid flow control valves hereinafter referred to as the piston valves. The cylinders 3 are provided with ported passages 6, 7, 8 and 9 which communicate with flow chambers 10, 11, 12 and 13, respectively, the flow characteristics of the meter being fully described and claimed in my co-pending application serially numbered 37,027 filed August 20, 1935, granted December 28, 1937 as patent numbered 2,103,482, the present invention having to do with the piston valve and its operation in relation to the measuring pistons.

In the above mentioned patent, the piston valves are integral with the measuring pistons and are movable the same distance as the measuring pistons, which necessitates a much larger meter housing.

In accordance with the present invention, the piston valve, although functionally operative to control the flow to and from the measuring pistons, is a separate element disposed between the measuring pistons and being operative by the latter through a mechanical linkage which reduces the length of travel of the piston valves a substantial amount. The mechanism for actuating the piston valves in response to movement of the measuring pistons consists of a lever 14 pivoted at 15 on a lug 16 which is fixed to be stationary on the inner wall of cylinder 3. Lever 14 is pivotally joined at 17 to a link 18 connected to a wrist pin 19 of the piston valve 5, and lever 14 is further pivotally connected at 20 to an actuating link 21 pivotally connected at 22 to a lug 23 of a piston yoke 24 joining the pistons 4. The yoke 24 is provided with slots 25 and 26 in which the wrist pin 19 and the pin 17 are adapted for movement independently of movement of the yoke 24. The stroke of the actuating lever 21 is adjustable by a set screw 27 which may be locked at 28 to its adjusted position.

Numeral 29 generally designates the calibrating mechanism, more clearly shown in Fig. 2 of the drawings, consisting of a cylinder 30, piston 31 and the stop 32 which is adjustable by removable screw cap 33 to vary the length of travel, and consequently the volume of fluid displacement in the calibrating cylinder 30. The calibrating mechanism of Fig. 2 is no part of the present invention.

As shown in Figs. 1 and 4 of the drawings, there are a plurality of measuring cylinders and pistons in parallel relation, and as in my former patent application above referred to, the piston valve of one group of measuring pistons controls the flow of fluid to the cylinders of the other group of the measuring pistons. Piston valves are connected by cranks 34 to a crank shaft 35, Fig. 4, having a worm 36 which interacts with a worm gear 37 mounted on the end of a register shaft 38, which is provided with a socket 39 for connection with the register mechanism not herein shown.

The operation of the above-described piston valve actuating mechanism is briefly as follows: When the measuring pistons are actuated by flow of fluid through the ported passages of the measuring cylinders, movement of the piston yoke 24 will cause the actuating link 21 to travel in a direction substantially parallel to the axis of the pistons 4, thereby actuating lever 14, which being fulcrumed at 15 will effect corresponding movement of the link 18, which being connected to wrist pin 19 causes piston valves 5 to be actuated. The ends of piston valves 5 are disposed in the same cylinders 3 as the measuring pistons 4 and are subjected to movement coaxially with the measuring pistons 4. However, because of the linkage mechanism, piston valves 5 move only a fraction of the distance of movement of measuring pistons 4 but directly proportionate to movement of piston elements 4. Consequently, the piston valves 5 may be said to be positively actuated and controlled in their movements by the measuring pistons 4 in the same manner as though they were an integral part of the measuring pistons.

By utilizing the reduction effected by the connecting lever and links to reduce the travel of the piston valves, the over-all length of the cylinders and the meter housing may be substantially reduced, resulting in a more compact meter structure without sacrificing any efficiency of the valve mechanism. By reduction of the meter in a more compact form, it may consequently be designed to be of greater strength than the longer type piston meter, and yet such design minimizes weight or mass of the metal in the meter housing.

It is therefore evident from the foregoing description that the meter design herein disclosed presents advantages over my prior form of meter, although operating on the same principle, with reduced cost of the meter structure.

Although one embodiment of the invention has been herein illustrated and described, it will be evident to those skilled in the art that various modifications may be made in the details of construction without departing from the principles herein set forth.

I claim:

1. In a fluid meter, a measuring piston actuated by fluid flowing through the meter, a piston valve in coaxial alignment with said measuring piston, and means connecting said piston valve and measuring piston adapted in response to movement of the latter to actuate the piston valve to subject it to reciprocatory movement coordinately with but less than the movement of the measuring piston.

2. In a fluid meter, a plurality of measuring pistons in coaxial alignment, a piston valve disposed coaxially with and between said measuring pistons, and means connecting said pistons and piston valve comprising mechanical linkage for actuating said piston valve in response to movement of the measuring pistons proportionate to and less than the movement of the latter.

3. In a fluid meter, measuring piston cylinders, a plurality of measuring pistons in said cylinders, a yoke connecting said pistons, a hollow piston valve disposed around the yoke and intermediate the measuring pistons mounted for movement in coaxial alignment with the measuring pistons, said piston valve having a plurality of piston heads for controlling the flow of fluid to and from the measuring piston cylinders, and means connecting the piston valve to the yoke of the measuring pistons to subject the piston valve to movement coordinately with the movement of the measuring pistons and for a lesser distance of travel than said measuring pistons.

4. In a fluid meter, a plurality of measuring cylinders, pistons in said cylinders and a piston valve interposed between said last-named pistons coaxially therewith, a lever fulcrumed to the inner wall of one of the measuring cylinders, the inner wall of one of the measuring cylinders, a link connecting the lever to the piston valve, and means connecting said lever to the measuring pistons whereby in response to movement of the latter the piston valve is subjected to movement coordinately with the measuring pistons.

5. In a fluid meter, a plurality of measuring cylinders, pistons in said cylinders joined to be simultaneously movable therein, a piston valve disposed between the measuring pistons having piston heads of the same diameter as the measuring pistons operatively disposed in the measuring cylinders, said piston valve and said measuring pistons being connected by links to a fulcrumed lever to render the piston valve operative in response to movement of the measuring pistons, said lever and links being proportioned to operate the piston valve at a fraction of the travel of the measuring pistons.

LYON McCANDLESS.